United States Patent [19]

Hilburn et al.

[11] 4,258,298
[45] Mar. 24, 1981

[54] DYNAMIC FOCUS CONTROL AND POWER SUPPLY FOR CATHODE RAY TUBE DISPLAYS

[75] Inventors: Hugh C. Hilburn, Glendale; Thomas W. Spilsbury, Phoenix, both of Ariz.

[73] Assignee: Sperry Corporation, New York, N.Y.

[21] Appl. No.: 107,986

[22] Filed: Dec. 28, 1979

[51] Int. Cl.³ .................................... H01J 29/58
[52] U.S. Cl. ........................... 315/382; 315/31 R
[58] Field of Search ............... 315/382, 31 R, 31 TV, 315/393, 395

[56] References Cited

U.S. PATENT DOCUMENTS 3,961,223  6/1976  Ray et al. ........................... 315/382

*Primary Examiner*—Theodore M. Blum
*Attorney, Agent, or Firm*—Howard P. Terry

[57] ABSTRACT

Apparatus is provided for effecting automatic dynamic compensation of the focal characteristics of electron beam tubes having substantially flat viewing faces, compensation in terms of two dynamic inputs including low frequency components primarily representing display brightness and high frequency components primarily representing electron beam displacement.

12 Claims, 4 Drawing Figures

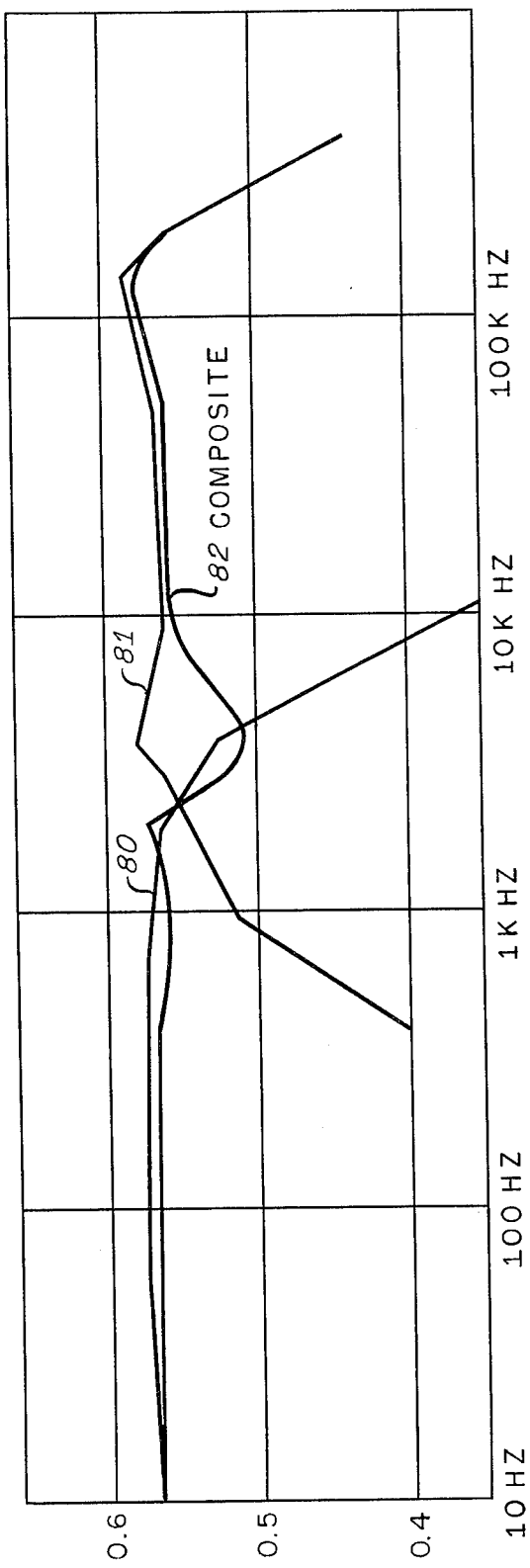
FIG. 2.
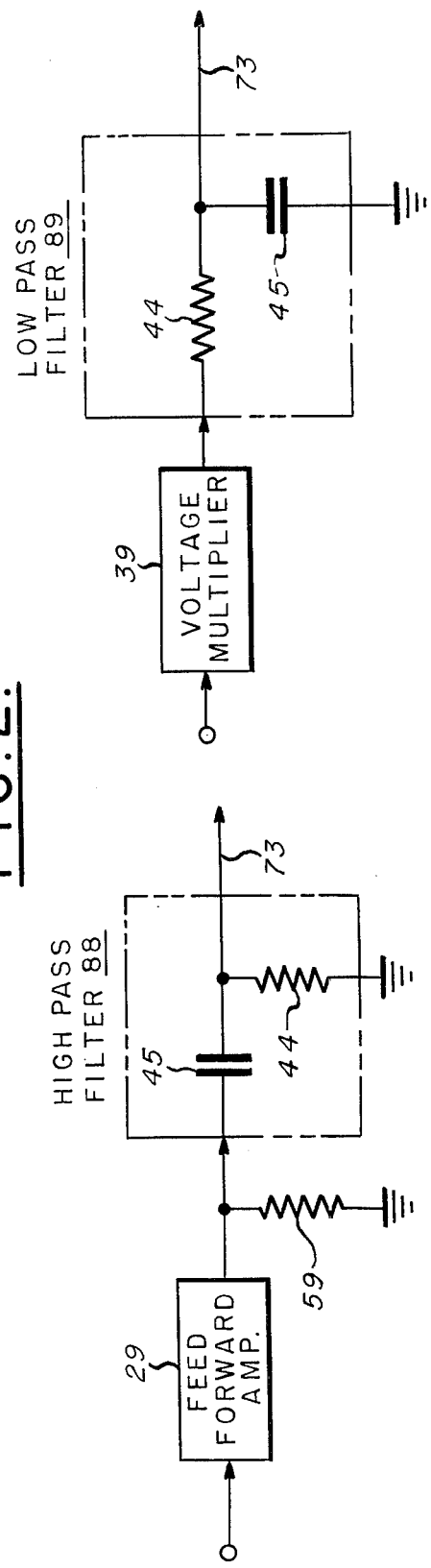
FIG. 3.
FIG. 4.

DYNAMIC FOCUS CONTROL AND POWER SUPPLY FOR CATHODE RAY TUBE DISPLAYS

BACKGROUND OF THE INVENTION

1. Field of the Invention

The invention relates to cathode ray tube displays and more particularly to electron beam focusing and power supply circuits for use particularly with such tubes having substantially flat viewing faces.

2. Description of the Prior Art

It is generally recognized by experts in the display art that the focal point of a cathode ray beam must coincide with the phosphor screen and that the distance the beam travels to that screen may vary considerably over the indicator face, especially in the instance of substantially flat-faced indicators. In addition, the focal point for the electron beam must be varied, again dynamically, as a function of brightness of the trace, or indirectly, as the average video input level.

With respect to the brightness function, an increase or decrease in the trace brightness is caused by an increase or decrease in electron beam current which, in turn, causes a space charge expansion or contraction of the electron beam diameter. Such variation therefore normally requires an adjustment of the electron beam focal point whenever the video input level is changed. This has been accomplished to a minor degree manually in the past, or automatically by employment of a small light sensor viewing the display face.

The focal distance change required for different deflections of the electron beam arises in the nature of the cathode ray tube face and the deflection coil geometry. In general, the curvature of the indicator viewing face does not coincide with the effective center of deflection characteristic of the deflection coils; without suitable compensation, elements of the displayed matter will be considerably blurred and distorted, especially at the periphery of the viewing face.

SUMMARY OF THE INVENTION

It is the objective of the present invention to provide improved means for effecting automatic compensation for both of the aforementioned dynamic effects. The novel power supply and compensation system of the invention takes into account the realization that the electron beam position at the viewing face changes with extreme rapidity, while the brightness parameter changes relatively slowly. Hence, the compensated focus power supply must respond over a wide band of frequencies to level the compensating response, for example, over a frequency band running from zero to 100 KHz or higher.

The desired wide band relatively level response is provided by the present invention and is particularly advantageous in that it affords the sharp and crisp display of either raster or stroke written picture elements. This is accomplished by use of a dual channel power generating system operating as a high voltage amplifier that efficiently responds to the two dynamic inputs, one the low frequency components representing display brightness and, the other, the high frequency components representing electron beam position or deflection.

BRIEF DESCRIPTION OF THE DRAWINGS

FIG. 2 is a graph useful in explaining the results achieved by use of the invention.

FIG. 3 and 4 are equivalent circuit diagrams representative of two aspects of the operation of the FIG. 1 apparatus.

DESCRIPTION OF THE PREFERRED EMBODIMENTS

Figure 1:
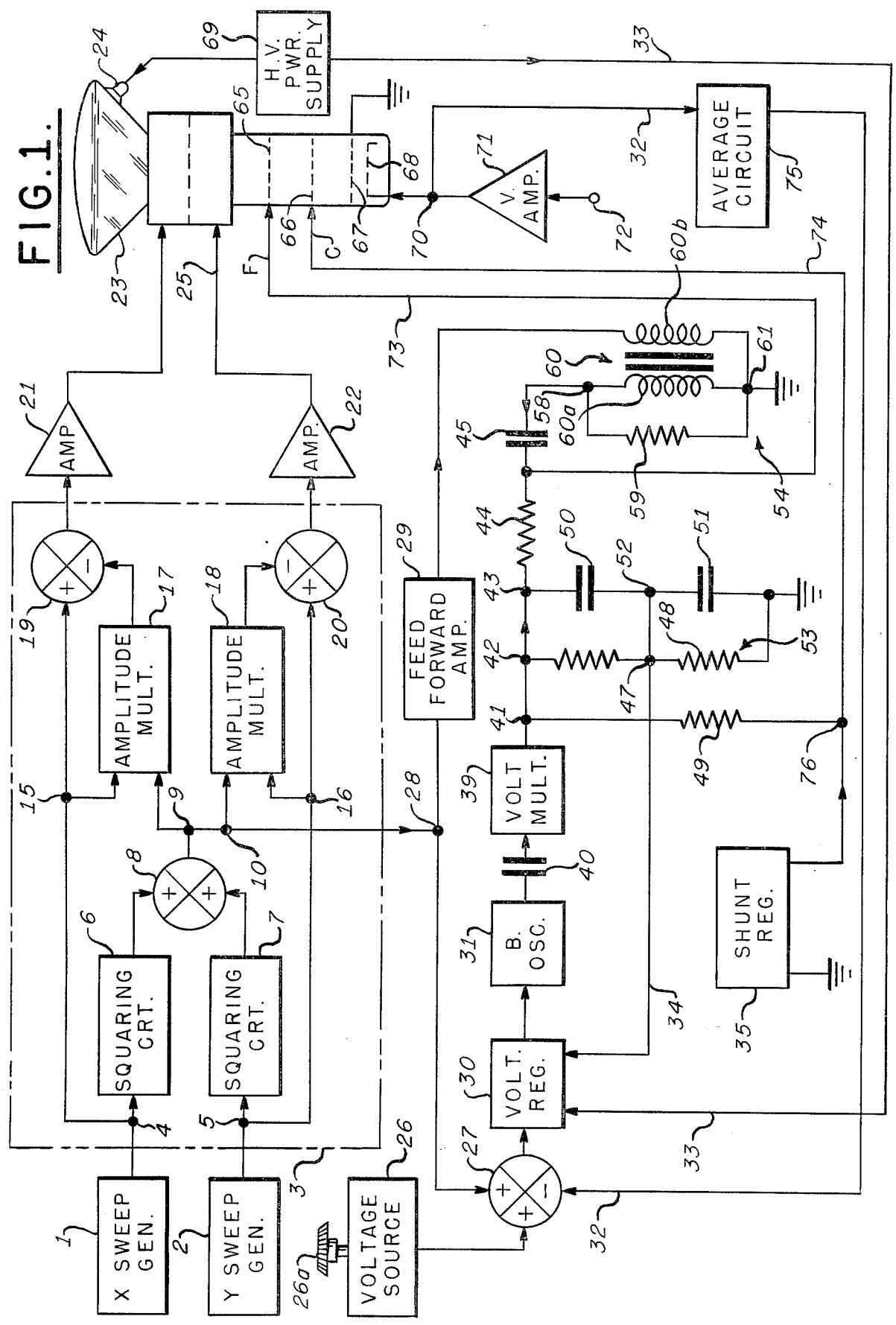
FIG. 1 is a wiring diagram showing electrical components of the invention and their interconnections.

In FIG. 1, raster scanning of the electron beam when intensified of cathode ray tube 23 depends upon the generation in a conventional way of x and y coordinate deflection or sweep wave trains by x coordinate sweep generator 1 and by y coordinate sweep generator 2. Generators 1 and 2 may be independent or may be synchronized in the conventional manner by a stable synchronous timing source (not shown). Correction of the linearity of the two deflection voltages is accomplished by a linearity correction circuit 3, which also supplies an important signal at junction 28 enabling the operation of the novel electron beam focus control system.

For providing the cathode ray beam x and y deflection voltages, the sweep waves at junctions 4 and 5 are respectively coupled to similar conventional squaring circuits 6 and 7 which generate electrical signals representing $x^2$ and $y^2$. The latter signals are coupled as inputs to a conventional summation device 8 in the polarity shown in the drawing, thereby providing an electrical output signal representative of $k(x^2+y^2)$ at junction 9, where k is a constant determined in the usual manner by the fixed elements of the circuits.

Conventional amplitude multiplier circuits 17, 18 are next provided. Multiplier 17 receives the x deflection wave via junction 15 as a first input and receives the dynamic signal on junction 9 on a second input. The output of multiplier 17 is representative of $kx(x^2+y^2)$ and is coupled to a conventional algebraic summation device 19 along with the x deflection signal, poled as illustrated in the drawing. The corrected deflection wave at the output of summation device 19 is coupled to the x coordinate power amplifier 21 and then to one of the coils of the conventional deflection coil pair 25.

In a similar manner, multiplier 18 receives the y deflection wave via junction 16 as a first input and also receives the signal on junction 10 as a second input. The output of multiplier 18 is representative of $ky(x^2+y^2)$ and is coupled to a conventional algebraic summation device 20 along with the y deflection signal, poled as indicated. The corrected deflection wave at the output of summation device 20 is coupled to the y coordinate power amplifier 22 and thence to the second of the conventionally disposed coils of the deflection coil pair 25.

Cathode ray tube 23 is generally a conventional kind of substantially flat-faced display device having in succession the usual high voltage anode electrode fed at terminal 24 from high voltage power supply 69, a focus control electrode 65, a cooperating electrode or grid 66, a grounded electrode or grid 67, and a cathode 68. Cathode 68 is supplied in the usual way with video signals representing television, radar, navigation, digitally processed information, or the like from a conventional source coupled at terminal 72 and amplified by video amplifier 71. A variety of types of cathode ray tubes may be used in the invention, so that the several electrodes 65, 66, 67, 68 may take several forms as is common practice and the electrodes are therefore represented schematically by dotted lines as a matter of convenience. Furthermore, the invention may be used either with magnetically or electrostatically deflection controlled cathode ray tubes of the electrostatically focussed type. Further, it may be used with a variety of types of scanning patterns, including raster, stroke, and raster-stroke scanning systems.

The portion of FIG. 1 now to be described accomplishes the wide band focus-controlling purpose of the invention by manipulation of the three input signals coupled to summation device 27; the first of these is the signal representative of $k(x^2+y^2)$ found on terminals 9, 10, and 28. The second signal is a unidirectional compensation signal whose magnitude depends upon characteristics of cathode ray tube 23 that vary from tube to tube because of factors inherent in their manufacturing processes. These variations are generally small and can readily be compensated when a particular cathode ray tube 23 is energized by use of the calibrated voltage source 26 provided with a manual amplitude adjustment knob 26a. The two input signals are supplied to summation device 27 in the polarity shown along with the averaged value of the video found at the output terminal 70 of video amplifier 71 and therefore on electrical lead 32, which is the output of a conventional averaging circuit.

The composite output of the cnventional summation device 27 is coupled to a conventional voltage regulator 30 which also receives a feed back signal via lead 34. Voltage regulator 30 is made operative when the cathode ray tube high voltage supply 69 is turned on in a conventional manner by virtue of an enabling signal coupled to it from supply 69 via lead 33. The output of voltage regulator 30 causes the production of a constant frequency, varying amplitude pulsed wave train in pulse generator or blocking oscillator 31, a wave form that is coupled through blocking capacitor 40 to a voltage multiplier 39 of the voltage doubling type. The doubled voltage appears across a resistance-capacitance network 53 wherein series resistors 46, 48 are connected from junction 42 to ground through junction 47 and series capacitors 50, 51 are likewise connected from junction 43 through a junction 52 to ground. The feed back lead 34 is coupled from the associated intermediate junctions 47, 52. Cooperating with the output at junction 41 of voltage multiplier 39 is a shunt voltage regulator 35 coupled between ground and junction 76, which junction 76 is connected by resistor 49 to junction 41.

A second network 54 cooperates with network 53 and is coupled thereto at junctions 43, 57 by resistor 44. Network 54 is formed about iron core transformer 60 whose windings 60a, 60b are coupled in common through terminal 61 to ground. Winding 60a is shunted by a resistor 59 connected between terminals 58 and 61.

The $k(x^2+y^2)$ signal at terminal 28, fed as previously noted to summation device 27, is additionally coupled by a conventional feed forward amplifier 29 to the ungrounded end of primary winding 60b. Junction 58, and therefore the ungrounded end of secondary winding 60a, is coupled via capacitor 45 to the terminal 57 of resistor 44. The signal at junction 76 of shunt regulator 35 is coupled by lead 74 to the control electrode 66 of cathode ray tube 23, while junction 57 lying generally between networks 53 and 54 is coupled via lead 73 to the focus control electrode 65 of cathode ray tube 23.

In operation, the invention behaves as a wide band focusing power supply responsive both to electron beam position and indirectly to video intensity, being actually responsive to the average level of beam current supplied by cathode 68, so that it provides a display that maintains a sharp focus over the entire face of cathode ray tube 23. The focal point of the electron beam at any given position on the face is controlled primarily as a dynamic function of electron beam deflection angle and as a function of the relatively slowly changing average display intensity. Thus, the invention uses a feed forward system involving feed forward amplifier 29 and network 54 to provide high frequency focusing response from 2 to 200 KHz, for example, coupled with a low frequency closed loop controlling network 53 to provide a relatively flat focusing response from zero to 2 KHz, for example.

The three signals combined by summation device 27 generate an output that is compared in a conventional manner within voltage regulator 30 with the fed back signal on lead 34 as a reference to produce the low frequency control signal. Voltage regulator 30 serves as a difference amplifier, in that it amplifies the difference between the fed back signal on lead 34 and the composite output of summation device 27. The output of voltage regulator 30 causes blocking oscillator 31 to produce a generally rectangular wave train of relatively constant frequency and with an amplitude depending on the level of the output of regulator 30. The alternating components of the wave train are coupled by capacitor 40 to voltage doubler 39, wherein the zero to 100 KHz control voltage is produced. Voltage doubler 39 may be conventional dual stage diodecapacitor supplying its output across the filter network 53. In this manner, the signal fed back on lead 34 to voltage regulator 30 contains primarily low frequency and direct current components; a version of the same signal is applied to shunt regulator 35 and via lead 74 to the cooperating electrode 66 of cathode ray tube 23. Thus, the invention supplies a shunt regulated voltage source 35 for the cooperating electrode 66.

Feed forward amplifier 29 extends the response to accommodate the significant harmonics of the dynamic signal on junction 9 out to 200 KHz. Amplifier 29, may, for example, utilize a conventional high speed operational amplifier section exciting a conventional current boosting amplifier section particularly responsive to the high frequency components of the electron beam position. Amplifier 29 drives the primary 60b of step-up tranformer 60, whose secondary 60a is capacity (45) coupled to lead 73 connected, in turn, to focus control electrode 65. The networks 53, 54 and the associated circuits act cooperatively as a frequency cross-over network as seen in FIG. 2, which will be further discussed, to assure stability of operation; in the figure, curve 80 represents the low frequency pass band, curve 81 the high frequency pass band, and curve 82 the composite of the two pass bands for one typical experimental version of the invention.

The high frequency band of the signals at junction 57 is formed by driving transformer 60 with the output of feed forward amplifier 29. Resistor 59 shunting the secondary 60a of transformer 60 is a damping resistor preventing ringing in secondary 60a of the tranformer 60. Capacitor 45 couples the transformer secondary (60a) output to terminal 57. In the high frequency band, the series capacitors 50 and 51 behave as a short circuit. FIG. 3 illustrates the effective high pass circuit 88 when operating in the high frequency band, showing the circuit elements particularly active in defining that band.

The low frequency band of the signals at junction 57 is formed by voltage multiplier 39 and the circuits preceding it. For this band, resistors 46, 48 form a voltage divider in network 53 for generating the signal fed back via lead 34 to voltage regulator 30. Series capacitors 50, 51 together form a compensating high frequency voltage divider for providing the corresponding feed back to regulator 30. At low frequencies, the secondary 60a of transformer 60 looks like a short circuit. In this manner, FIG. 4 illustrates the effective low pass circuit 89 when operating in the low frequency band, the circuit elements particulary active in providing the desired output being illustrated.

In more detail, FIG. 2 presents the swept sinusoidal frequency response of the cross-over system in a semilogarithmic plot. The low frequency or regulator (30)-multiplier (39) response alone is that of curve 80, while the high frequency or feed forward amplifier (29)-transformer (60) response is that of curve 81. The composite curve 82 shows the composite output (peak-to-peak kilovolts versus frequency). The fixed direct current component supplied to focus electrode 65 is not shown in the graphs and may be selected between 3.5 to 5.5 kilovolts.

Accordingly, it is seen that the invention is an efficient and effective arrangement for correcting focal point characteristics of a trace-generating electron beam for cathode ray displays in which dynamically compensated focus control is required, and including both magnetically and electrostatically deflection-controlled cathode ray tubes of the electrostatically focused kind. The invention provides a full solution for the focus control problem in color and in monochrome displays in an arrangement reducing the number of parts, size, and complexity. Stability and efficiency are enchanced, making the invention suitable for use in a wide variety of applications, including airborne displays.

While the invention has been described in its preferred embodiments, it is understood that the words which have been used are words of description rather than of limitation and that changes may be made within the purview of the appended claims without departing from the true scope and spirit of the invention in its broader aspects.

What is claimed is:

1. In a display employing a cathode ray beam tube device including first and second beam deflection means and at least cathode means, focusing electrode means, and control electrode means:
   first circuit means generating first and second electrical
   signals for respectively energizing said first and
   second beam deflection means,
   video input means for controlling said cathode means,
   second circuit means responsive jointly to said first and
   second electrical signals,
   first algebraic summation means responsive to said video
   input means and to said second circuit means,
   low pass filter means responsive to said first algebraic summation means for producing a first output, and high pass filter means responsive to said first circuit means for producing a second output,
   said focusing electrode means being responsive to said
   first and second outputs.

2. Apparatus as described in claim 1 wherein said first algebraic summation means is additionally responsive to bias source means.

3. Apparatus as described in claim 1 wherein said second circuit means comprises:
   first and second signal squaring means respectively responsive to said first and second electrical signals, and
   second algebraic summation means responsive to said first and second signal squaring means.

4. Apparatus as described in claim 1 further including:
   signal amplitude regulator means responsive to said first algebraic summation means,
   pulse generator means whose output amplitude is responsive to said signal amplitude regulator means, and
   signal amplitude multiplier means responsive to said pulse generator means,
   said low pass filter means being responsive to said signal amplitude multiplier means.

5. Apparatus as described in claim 4 wherein said signal amplitude regulator means is additionally responsive to said signal amplitude multiplier means.

6. Apparatus as described in claim 5 wherein said control electrode means is jointly responsive to shunt regulator means and to said signal amplitude regulator means.

7. Apparatus as described in claim 1 wherein said low pass filter means includes parallel connected resistor-capacitor means.

8. Apparatus as described in claim 7 further including feed forward amplifier means responsive to said second circuit means.

9. Apparatus as described in claim 8 wherein said high pass filter means is directly responsive to said feed forward amplifier means and includes:
   transformer means having an input responsive to said feed forward amplifier means,
   series connected capacitor and resistor means coupling the output of said transformer means to said low pass filter means.

10. Apparatus as described in claim 9 further including:
    junction means disposed between the said capacitor and the said resistor of said series connected capacitor and resistor means,
    said junction means being coupled to said focusing electrode means for conveying low and high frequency focus control signal components thereto.

11. Apparatus as described in claim 1 further including:
    first amplitude multiplier means responsive to said first electrical signal and to said second circuit means, and
    first subtracter means responsive to said first amplitude multiplier means and to said first electrical signal,
    said first beam deflection means being responsive to said first subtracter means.

12. Apparatus as described in claim 11 furtherincluding:
    second amplitude multiplier means responsive to said first electrical signal and to said second circuit means, and
    second subtracter means responsive to said second amplitude multiplier means and to said secnd electrical signal,
    said second beam deflection means being responsive to said second subtracter means.

\* \* \* \* \*